Figure 1:
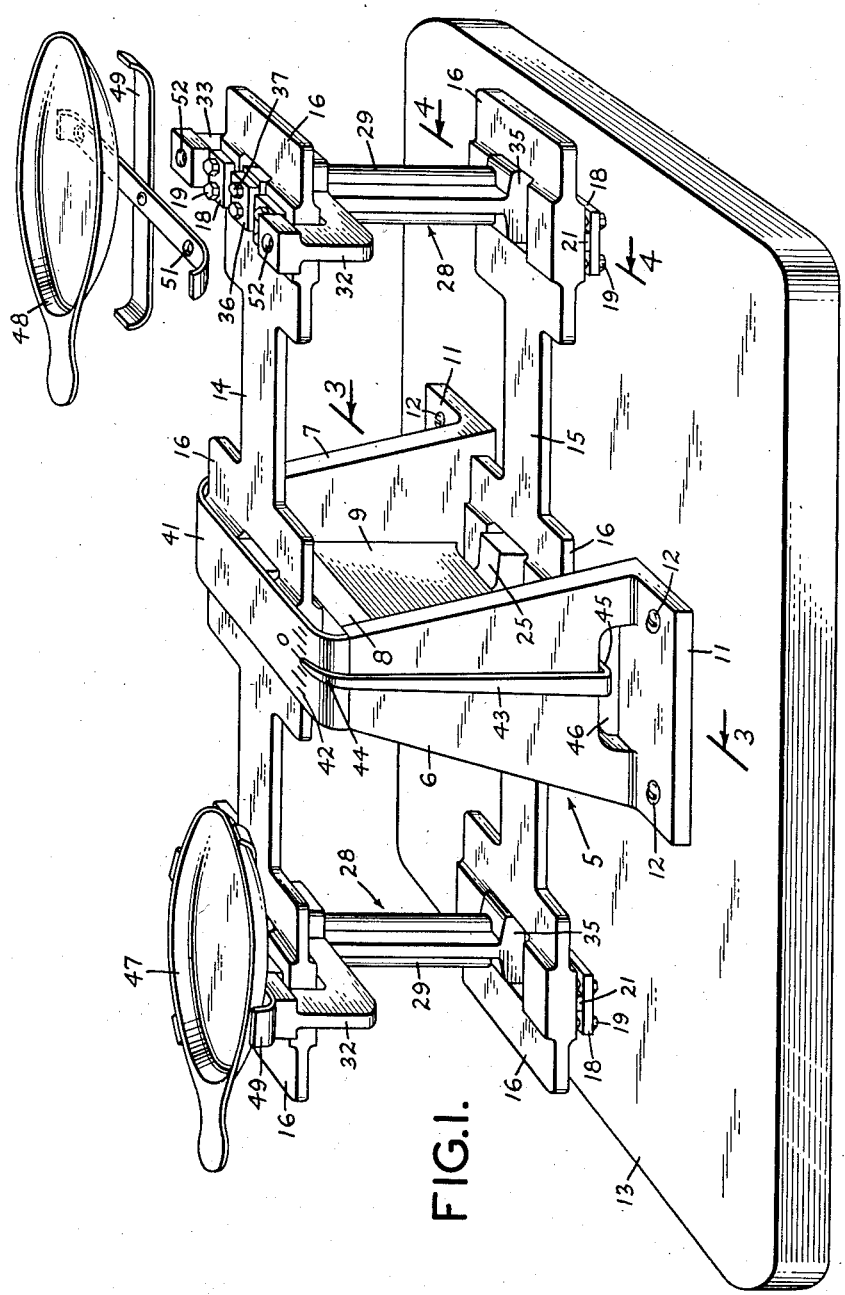

June 17, 1958 H. A. HADLEY ET AL 2,839,288
EVEN-BALANCE, OVER-AND-UNDER WEIGHING SCALES
Filed Jan. 27, 1954 2 Sheets-Sheet 1

INVENTORS.
HARLAN A. HADLEY
LESTER D. SINGLETON
BY
ATTORNEY.

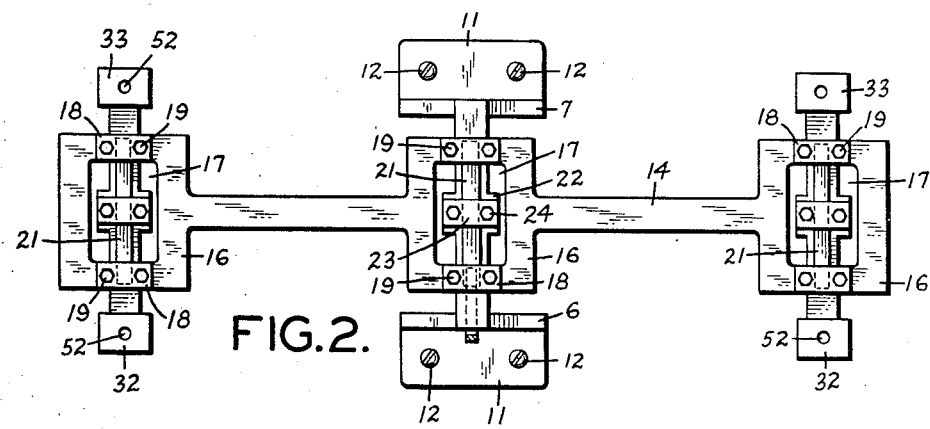
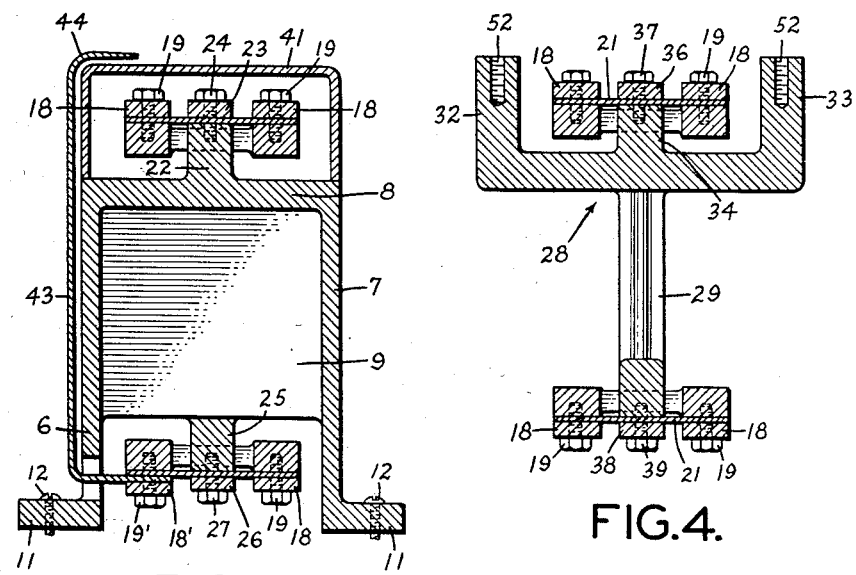

United States Patent Office 2,839,288
Patented June 17, 1958

2,839,288

EVEN-BALANCE, OVER-AND-UNDER WEIGHING SCALES

Harlan A. Hadley and Lester D. Singleton, Burlington, Vt., assignors, by mesne assignments, to Toledo Scale Corporation, Toledo, Ohio, a corporation of Ohio Application January 27, 1954, Serial No. 406,422

6 Claims. (Cl. 265—54)

This invention relates to improvements in weighing scales, and relates more particularly to weighing scales of the even-balance, over-and-under weight indicating type.

An important object of this invention is the provision of a simple, compact and accurate even-balance, over-and-under weighing scale.

Another object of this invention is to provide an even-balance, over-and-under weighing scale wherein knife edges and bearings on which they rest are replaced by flexible metal bands.

A further object of this invention is to provide an even-balance, over-and-under weighing scale of relatively few, interchangeable, and readily replaceable parts.

Still another object of this invention is the provision of an even-balance, over-and-under weighing scale requiring no housing or tower or other structure to provide amplification for the index pointer giving the over or under reading.

Other objects of this invention, together with certain details of construction and combinations of parts, will appear from the following detailed description and will be pointed out in the appended claims.

In the accompanying drawings wherein a preferred embodiment of this invention is shown, Fig. 1 is a perspective view of the weighing scale of this invention, Fig. 2 is a plan view of the lever and the manner of connecting the same to other weighing scale elements, center parts of the weighing scale being omitted in the interest of clarity, Fig. 3 is a cross-sectional view taken on line 3—3 of Fig. 1, and Fig. 4 is a cross-sectional view taken on line 4—4 of Fig. 1.

Like reference numerals indicate like parts throughout the several views of the drawings.

Referring now to the drawings for a detailed description of this invention, the reference 5 indicates generally a fulcrum stand comprising vertical standards 6 and 7 connected by a cross-piece 8 and a web 9 which may be integral with the standards, as shown. The fulcrum stand 5 may be provided with feet 11 integral with the standards through which are passed bolts 12 for attaching said fulcrum stand to a base 13.

In weighing scales of the type with which this invention is concerned, there is usually provided an equal-arm lever provided with knife edge fulcrum pivots which are supported on suitable bearings carried on a fulcrum stand. At each end of the lever is fixed a load pivot on the knife edges of which are carried end-parallels or stirrups. The stirrups support at their upper ends the load and counterweight platforms or pans, and the lower ends of the stirrup are connected by a check link. The lever, the stirrups and the check link, for accurate weighing, should maintain as perfect a parallelogram relationship as possible, a parallelogram being formed by the longitudinal center line of the lever, the vertical center lines of the stirrups and the longitudinal center line of the check link, and two parallelograms being formed by splitting the aforementioned parallelogram by a vertical line passing through the fulcrum pivot line and through the central pivot line of the check link. It is about this latter vertical line that the lever, the stirrups and the check link tilt during the operation of the weighing scale. By maintaining the parallelogram relationship of the lever, the stirrups and check link as true as possible, the errors, which arise when the load and counterweight platforms or pans are loaded unequally or when the loads are placed off-center thereon, are avoided.

In accordance with this invention, the lever and check link are made of the same elements and are interchangeable. Moreover, they are made in lots of substantial number to extremely close tolerances. Accordingly, the lever and check link can readily be replaced from stock parts with little or no selecting effort being necessary. In Fig. 1 of the drawings, the reference numeral 14 indicates the lever element, hereinafter referred to as the lever, and reference numeral 15 the check link element, hereinafter referred to as the check link.

The lever and check link each comprise a longitudinally extending bar of any suitable material having in the center thereof and at each of its extremities an enlarged portion, indicated by reference numeral 16. A rectangular opening 17 is provided in each of the enlarged portions, said enlarged portions and said openings being in substantially the same horizontal plane. Across the long axis of each of the openings 17 is attached, as by means of clamps 18 and bolts 19, a tape or band 21 of a suitable metal, preferably steel. The band 21 of the central opening of the lever 14 is attached to a projection 22, integral with cross-piece 8 of the fulcrum stand, by means of a clamp 23 and bolts 24, while the band 21 of the central opening of the check link 15 is attached to a depending boss 25, integral with web 9 of the fulcrum stand, by means of a clamp 26 and bolts 27.

A stirrup, generally indicated by reference numeral 28, is attached between each pair of corresponding extremities of lever 14 and check link 15. The stirrups are identical in construction and are also interchangeable and comprise a post 29 on which is supported a U-shaped member, the arms of which are indicated by reference numerals 32 and 33. An integral projection 34 is provided on said U-shaped member substantially centrally between arms 32 and 33 for the purpose of forming an additional point of attachment for the bands 21 spanning end openings of lever 14. The lower end of post 29 is provided with an enlarged portion 35. The bands 21 in end openings of the lever 14 are connected to projection 34 of the stirrups by means of clamps 36 and bolts 37, while the bands 21 in the end openings of the check link 15 are attached to enlarged portion 35 of the stirrups by means of clamps 38 and bolts 39.

A rectangular plate or shield 41 curved at its ends straddles the lever 14 across the central enlarged portion thereof and is fixed in any suitable manner to the tops of standards 6 and 7. One end of the shield 41 is provided with a chart 42 having indicia extending on both sides of the zero mark. An indicator 43, which cooperates with the chart to indicate weight values, has an upper end which is curved concentrically with the edge of shield 41. The lower end of the indicator is bent at a substantial right-angle to form a horizontal portion 45 which passes through an opening 46 at the bottom of standard 6 and is attached to the central enlarged portion 16 by the clamp and bolt designated by reference numerals 18' and 19', respectively.

Load and counterweight pans 47 and 48 are supported on the stirrups by means of spiders 49 which are attached to said stirrups by means of bolts (not shown) passing through suitable holes 51 in the spiders and holes 52 in arms 32 and 33 of the U-shaped members surmounting the stirrups.

In the structure outlined above, the bands 21 spanning the end openings function as load bands and supports for the stirrups, while the bands 21 spanning the central openings function as fulcrum bands for the lever 14 and the check link 15.

The embodiment of our invention above described in connection with the showing in the drawings is to be regarded as illustrative only since our invention is susceptible of variation, modification and change within the spirit and scope of the appended claims.

What we claim as new and desire to secure by Letters Patent of the United States is:

1. In a weighing scale of the class described wherein the weighing scale elements include a lever, a check link and means operatively connecting said lever and said check link to each other, the lever and the check link being identical in configuration and interchangeable with each other in use as lever and check link and each comprising a bar having a plurality of openings therein, and metal bands across said openings for connecting said lever and said check link to other weighing scale elements.

2. In a weighing scale of the class described, a lever and check link identical in configuration and interchangeable with each other in use as lever and check link and each comprising a bar having a plurality of openings therein, a metal band attached across each of said openings, a stand on which said lever and said check link are fulcrumed by means of corresponding metal bands in said lever and check link openings, and a stirrup operatively connected to each pair of corresponding ends of the lever and check link by means of the metal bands in said lever and check link openings.

3. In a weighing scale of the class described, a lever and a check link identical in configuration and interchangeable with each other in use as lever and check link and each comprising a bar having a central opening and an opening adjacent each end thereof, a metal band attached across each of said openings, a stand on which said lever and said check link are fulcrumed by means of the metal bands in said central openings, and a stirrup connected to each pair of corresponding ends of the lever and check link by means of the metal bands in the end openings in the lever and check link.

4. A weighing scale of the class described, a stand, a lever and a check link, each comprising a longitudinally extending bar having a plurality of openings therein and a metal band attached across said openings, fulcrumed on said stand by means of said metal bands, a stirrup operatively connected to each pair of corresponding ends of the lever and check link, a chart supported on said stand, and an indicator carried by said check link for cooperating with said chart to indicate weight values.

5. A weighing scale in accordance with claim 4 wherein the openings are rectangular in shape and the metal bands are attached to said lever and said check link across the long axis of each of the openings.

6. A weighing scale of the class described, a stand, a lever and a check link, each comprising a longitudinally extending bar having a plurality of openings therein and a metal band attached across said openings, fulcrumed on said stand by means of said metal bands, a stirrup operatively connected to each pair of corresponding ends of the lever and check link, load and counterweight pans carried by said stirrups, a chart supported on said stand, and an indicator carried by said check link for cooperating with said chart to indicate weight values.

References Cited in the file of this patent

UNITED STATES PATENTS

| 299,757 | DuBrul | June 3, 1884 |
| 1,167,584 | Michalis | Jan. 11, 1916 |
| 1,169,929 | Conway | Feb. 1, 1916 |
| 2,144,845 | Kniesche | Jan. 24, 1939 |
| 2,310,493 | Richard | Feb. 9, 1943 |
| 2,475,684 | Weckerly | July 12, 1945 |
| 2,584,950 | Weckerly | Feb. 5, 1952 |
| 2,692,771 | Holt | Oct. 26, 1954 |

OTHER REFERENCES

Pages 38 and 39 of "Industrial Weighing," by Douglas M. Considine, published by Reinhold Publishing Corporation, 330 W. 42nd Street, New York, 1948.

Disclaimer and Dedication

2,839,288.—*Harlan A. Hadley* and *Lester D. Singleton*, Burlington, Vt. EVEN-BALANCE, OVER-AND-UNDER WEIGHING SCALES. Patent dated June 17, 1958. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]